(12) United States Patent
Bohr et al.

(10) Patent No.: US 6,179,163 B1
(45) Date of Patent: Jan. 30, 2001

(54) SYSTEM AND METHOD FOR EVALUATING THE PRESENCE OF AIR IN A LIQUID-STATE FUEL STREAM

(75) Inventors: William J. Bohr, Jenison; Michael D. Walters, Hudsonville; Mark Wordley, Kentwood, all of MI (US)

(73) Assignee: Deleware Capital Formation, Inc., Wilmington, DE (US)

( * ) Notice: Under 35 U.S.C. 154(b), the term of this patent shall be extended for 0 days.

(21) Appl. No.: 09/330,474

(22) Filed: Jun. 11, 1999

(51) Int. Cl.$^7$ ........................................................ B67D 5/16
(52) U.S. Cl. .............................. 222/72; 222/318; 55/447; 55/459.1; 55/460; 417/310
(58) Field of Search ........................ 222/72, 318; 55/447, 55/459.1–460; 417/310

(56) References Cited

U.S. PATENT DOCUMENTS

| | | |
|---|---|---|
| 3,419,035 | 12/1968 | Hartz . |
| 3,715,863 | * 2/1973 | Zanoni . |
| 4,978,374 | * 12/1990 | Janssen et al. . |
| 5,884,809 | 3/1999 | Wood et al. . |

FOREIGN PATENT DOCUMENTS

| | | |
|---|---|---|
| 0 357 513 | 3/1990 | (EP) . |
| 0 473 818 | * 3/1992 | (EP) . |
| 0 556 527 | * 8/1993 | (EP) . |
| WO 98/50303 | * 11/1998 | (WO) . |

* cited by examiner

Primary Examiner—Steven O. Douglas
Assistant Examiner—Timothy L. Maust
(74) Attorney, Agent, or Firm—Flynn, Thiel, Boutell & Tanis, P.C.

(57) ABSTRACT

A system (21) for monitoring the quantity of air in a liquid-state fuel stream discharged from a dispenser (20). The dispenser includes a pump (26) that draws the fuel from a storage tank (22). The fuel stream discharged from the pump is applied to an air separator (38) in which the air and vapor-state fluids are removed from the fuel stream. The gas-removed fuel stream is allowed to flow to nozzle (44) for dispensing. The gas stream created by the air separator is flowed to an air elimination chamber (41). The fuel in the gas stream separates from the air in the air elimination chamber and is returned to an input side of the pump. The air in the air elimination chamber is vented through a fixed opening to the ambient environment. The monitoring system (21) includes a transducer (48) that monitors the rate of air flow through the air elimination chamber. This monitoring may be performed by monitoring the air pressure in the chamber upstream of an orifice through which the air is vented to atmosphere. If the air flow rate is greater than a set level, the system closes a valve (57) that regulates fuel flow to the nozzle (44). Thus, this system (21) prevents fuel that contains an excessive quantity of gaseous-state fluids from being dispensed.

29 Claims, 8 Drawing Sheets

SYSTEM AND METHOD FOR EVALUATING THE PRESENCE OF AIR IN A LIQUID-STATE FUEL STREAM

FIELD OF THE INVENTION

This invention is generally related to a system for delivering liquid-state fuel. More particularly, this invention is related to a system and method for evaluating the presence of air in a the liquid-state fuel stream that is being delivered.

BACKGROUND OF THE INVENTION

A dispensing system is the assembly at a gasoline station that actually delivers the fuel (e.g. gasoline, diesel fuel, kerosene or alcohol) from a storage tank into the tank of the vehicle in which the fuel is to be used. At most gasoline stations and other locations at which fuel is dispensed, the fuel is stored in an underground storage tank. The dispensing system includes a pump that draws fuel from the storage tank to an above ground elevation so that it will flow into the vehicle fuel tank. In a typical dispensing system, the fuel is pumped from the storage tank, passed through a flow meter and then delivered to the vehicle through a flexible hose. The flow meter performs a volumetric measure of the fuel that is discharged to provide the data needed to ensure that the customer is accurately charged for the amount of fuel delivered. Often this charge data is presented on a display associated with a data processing unit that also forms part of the dispensing system.

The Applicant's Assignee's U.S. Pat. No. 5,884,809, entitled AIR SEPARATING FUEL DISPENSING SYSTEM, issued Mar. 23, 1999, which is incorporated herein by reference, discloses one such fuel dispensing system. This particular fuel dispensing system includes a suction pump that draws the fuel from the underground storage tank. The fuel discharged from the pump is initially forwarded to an air-separating chamber. In this chamber, the fluid discharged from the pump is forced to undergo a cyclonic flow. Forcing the fluid to undergo this type of flow separates air and any vaporized fuel that may be entrained in the liquid-state fuel stream. The air-removed fuel stream is then forwarded downstream to the metering device and, once metered, to the hose for delivery to the vehicle.

The air, and any fuel entrained therein, extracted from the fuel stream is forwarded to an air elimination chamber. This chamber serves as an enclosed space in which the fuel that is contained in the air stream passively separates from the air. This fuel is returned to the fuel stream upstream of the pump. The air is exhausted into the ambient environment.

The above-described fuel dispensing system also has a sub-assembly that detects the quantity of air in the fuel stream discharged from the pump. This sub-assembly is necessary because sometimes, the quantity of entrained air is so large, the air separator is not able reduce the air in the pumped fuel stream down to the essentially zero-level preferred by individuals purchasing fuel. The air-detecting sub-system in the '809 Patent operates by monitoring the differential pressure across the air separation chamber. A drop in this pressure difference is recognized as an indication that there is an appreciable rise in the quantity of air present in the fuel stream discharged from the pump. This differential pressure measurement is made with either a fluid-set valve or an electronic transducer. If a pre-determined drop in the differential pressure is detected, a fuel shut-off valve connected to the air-monitoring sub-system is set closed. Thus, this sub-system continually monitors the quantity of air in the fuel stream and, when the quantity of air reaches unacceptable levels, prevents the dispensing of the fuel. The above-described air-detecting sub-system works reasonably well for evaluating the quantity of air and vaporized fuel in fuel stream that is discharged from a pump. However, it requires one to install two fluid-carrying conduits to the air separation chamber of the dispensing system in which this sub-system is installed. Having to provide these conduits and the associated differential pressure sensor can significantly add to the cost of the associated dispensing system.

There have been some attempts to provide air detecting sub-systems for use with a dispensing system that monitor only a single parameter. One such system operates by monitoring the density of the gaseous state fluids removed by the air separator. Another system operates by monitoring the force of a jet of gaseous state fluid that is discharged from the air separator. A disadvantage of these systems is that they both measure multi-state fluid streams. Because these streams either are formed from two different types of fluids, or fluids in both the gas and liquid state, the measurement of these streams may sometimes not accurately indicate the volume of air that is present in the fuel stream discharged from the pump.

SUMMARY OF THE INVENTION

This invention is directed to a new and useful system and method for monitoring the quantity of air and vapor-state fuel entrained in a fuel stream flowing through a fuel dispensing system. In the system and method of this invention, this measurement is performed by monitoring the flow of the air in the air stream removed from by the air separator and that flows through the air eliminator. In some versions of this invention, the rate of this air flow is monitored by monitoring the pressure produced by the air as it is exhausted from the system through an orifice. Once air pressure exceeds a pre-defined limit, a complementary valve is set to stop the discharge of the fuel from the dispensing system.

BRIEF DESCRIPTION OF THE DRAWINGS

The invention is pointed out with particularity in the claims. The above and further features of the invention may be better understood by reference to the following description taken in conjunction with the accompanying drawings, in which:

DETAILED DESCRIPTION

Figure 1:
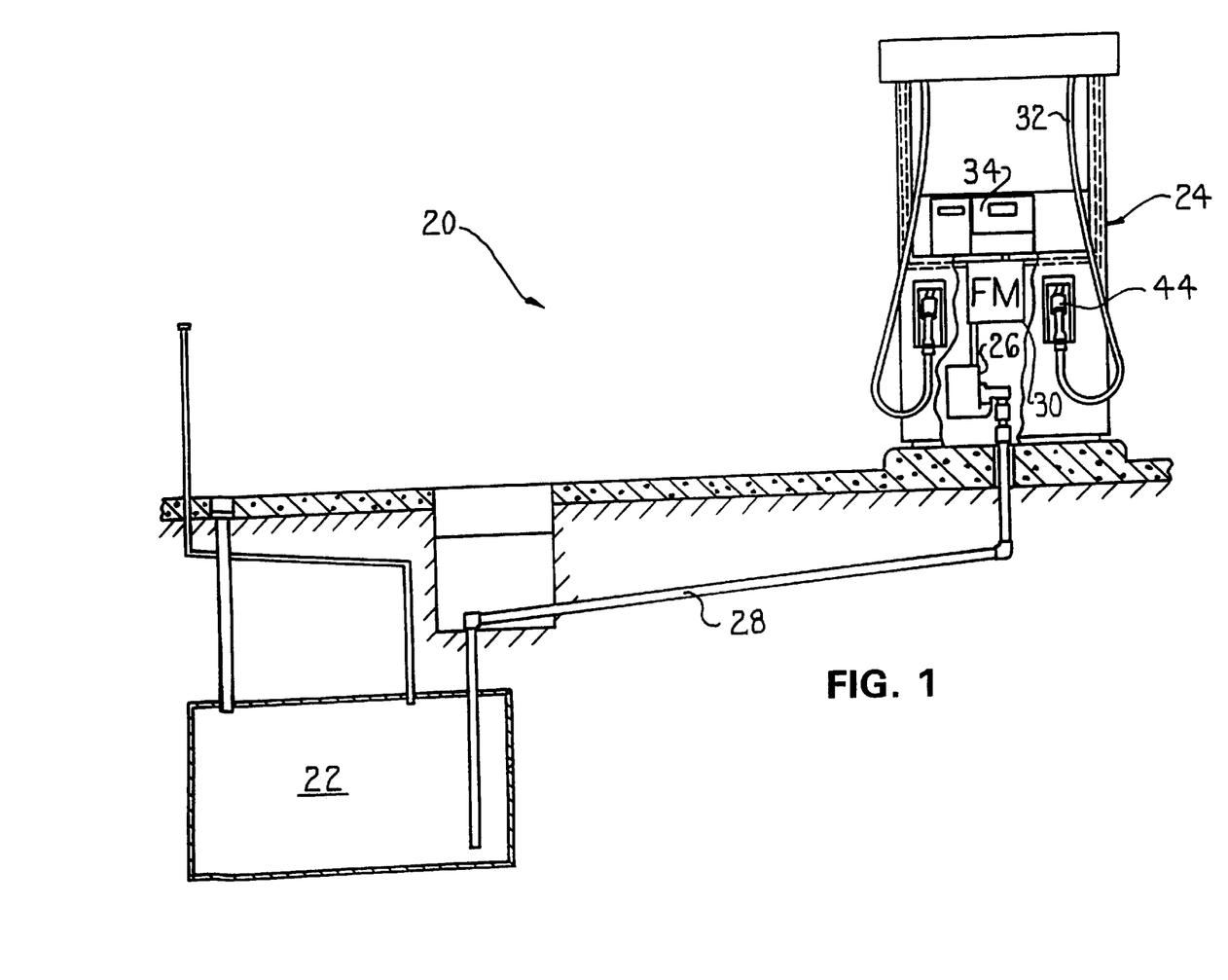
FIG. 1 is a diagrammatic illustration of the environment in which the air detector system of this invention is employed.
Figure 2:
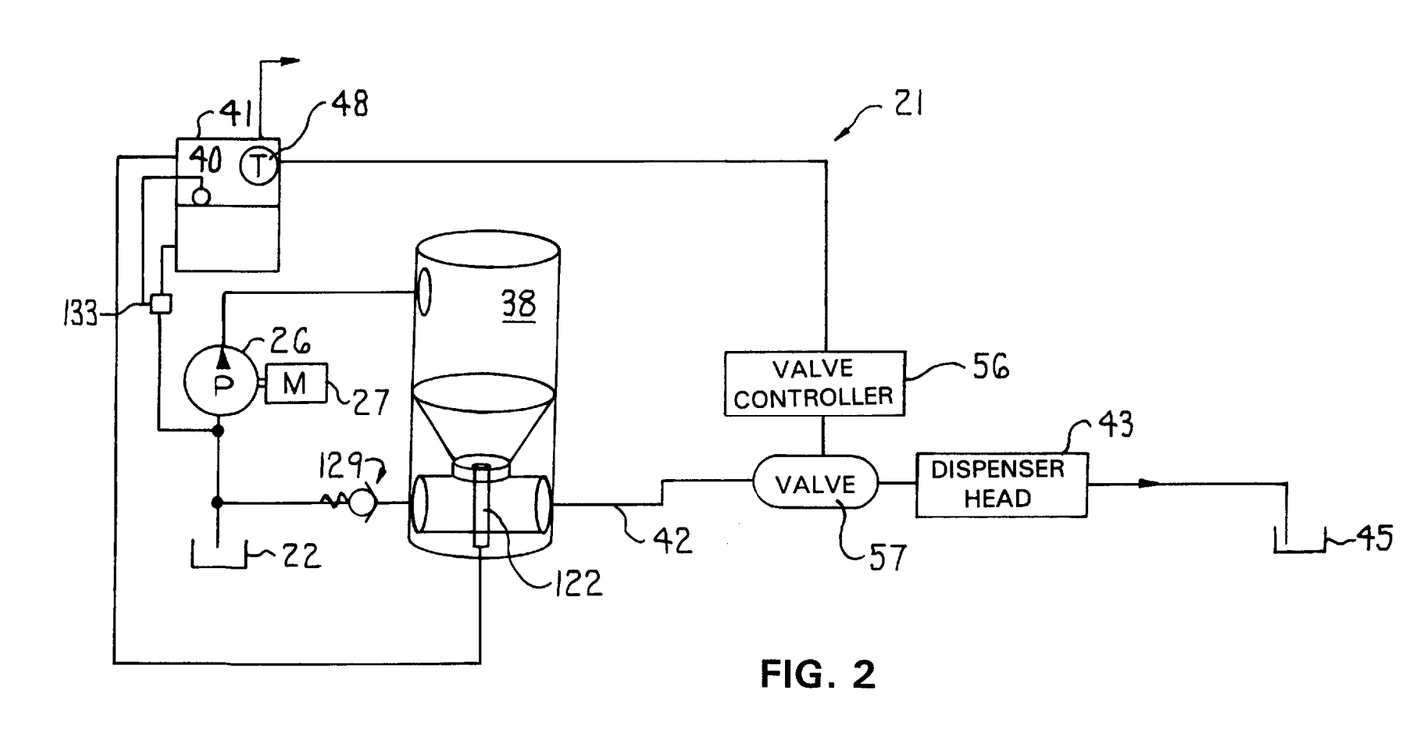
FIG. 2 is a block diagram illustrating both the components of the air detector system and the dispensing system in which it is installed.
Figure 3:
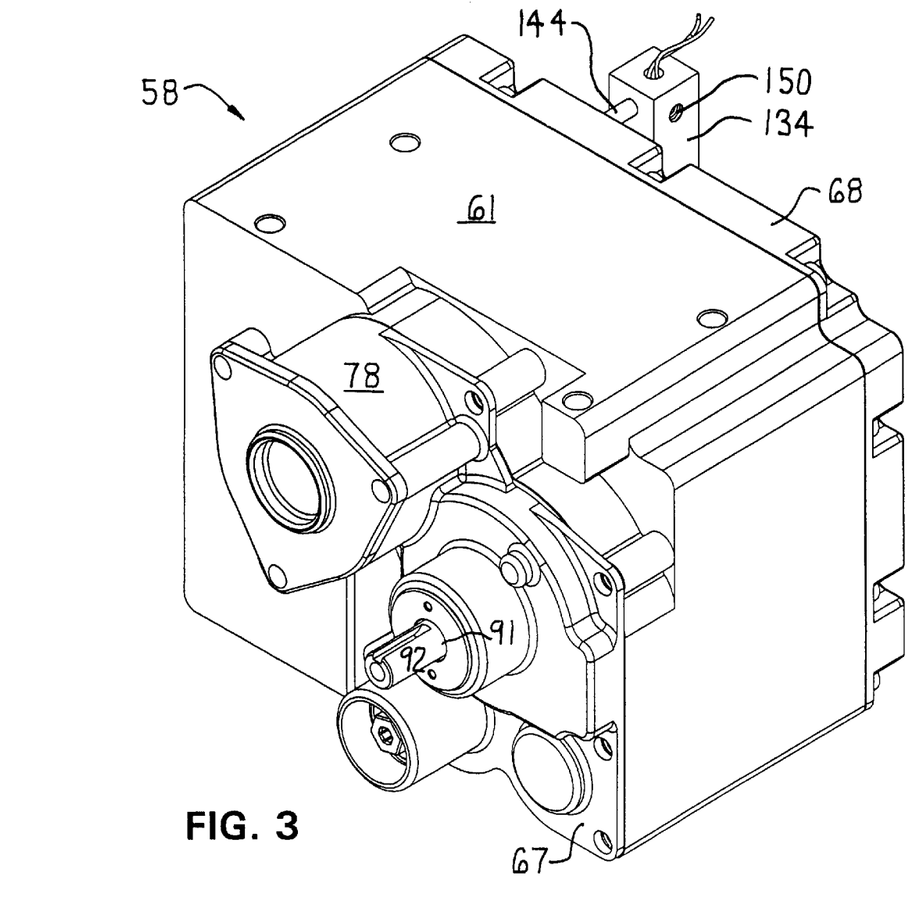
FIG. 3 is a perspective view of the front of the outside of a pump casing to which components of the vapor monitoring system are mounted.

FIGS. 1 and 2 depict a dispensing system 20 that is employed to facilitate the delivery of liquid-state fuel to a vehicle and to which an air detector system 21 of this invention is installed. The fuel is contained in an underground storage tank 22. The dispensing system 20 is contained in an above ground dispenser unit 24. Integral with the dispensing system 20 is a suction pump 26. A motor 27 drives pump 26. Fuel is drawn from the storage tank 22 into the pump 26 through a supply line 28. The fuel is then discharged from the pump 26 into a flow meter 30 and then through a flexible hose 32 for delivery into the vehicle. The flow meter 30 provides a volumetric measure of the quantity of the fuel that is delivered to the vehicle. Data signals representative of this volumetric measure are supplied by the flow meter 30 to a processing unit 34. The processing unit 34 both displays an indication of the quantity of the fuel delivered and an indication of the charge to the customer.

The pump 26 has an inlet through which fuel is drawn from the storage tank 22. The fuel is discharged from the pump 26 through an outlet into a centrifugal air separator 38. The fuel stream is introduced into the air separator 38 in a cyclonic flow pattern so that air entrained in the liquid fuel stream is forced to the center of the chamber. The air, as well as any fuel and fuel vapor also forced to the center of the air separator, flows from the air separator to an air eliminator 40. Air eliminator 40 has a chamber 41 in which the fuel passively separates from the air. The separated fuel is returned to the inlet of pump 26. The air is exhausted to the atmosphere as will be discussed hereinafter.

The gas-removed, liquid-state fuel stream produced by the air separator 38 is discharged through a conduit 42 to dispenser head 43. The dispenser head 43 includes a number of the components found in a conventional dispensing system namely, the flow meter 30 and an on/off valve. The fuel flows from the dispenser head 43 through the flexible hose 32. The discharge of fuel from the flexible hose 32 into the tank 45 of a vehicle is controlled by a nozzle 44 at the end of the hose. In some versions of the invention, hose 32 and nozzle 44 may have a return line that facilitates the recovery of vapor that is discharged from the vehicle tank 45.

The air detector system 21 includes a transducer 48 that monitors air flow through the air elimination chamber 41. In some preferred versions of the invention, transducer 48 performs this monitoring by monitoring the air pressure inside the air elimination chamber 41. This pressure, relative to atmospheric pressure, provides an indication of the rate of air flow between the enclosed air elimination chamber 41 and the ambient environment. In some specific embodiments of this version of the invention, transducer 48 is a pressure switch. This pressure switch is set to undergo an open/closed state transition whenever the pressure in the air elimination chamber rises above a pre-defined limit.

The open/closed state of the pressure switch 48 is monitored by a valve controller 56. Valve controller 56, based on the open/closed state of pressure switch 48, regulates the open/closed state of a solenoid-actuated valve 57 that is downstream of and in-line with the conduit 42 through which the liquid-state fuel is discharged from the air separator 38. Valve 57 thus regulates fuel flow from the air separator 38 to the delivery hose 32.

FIGS. 3–6 illustrate how the pump 26 is disposed in a pump casing 58 and the air detector 21 is mounted to the casing. Pump casing 58 includes a body 61 that has a primary wall 62. Casing body also has a base wall 63, opposed side walls 64 and a top wall 65 that all surround the primary wall 62. Walls 63–65 extend rearward of the primary wall 62 for a reason to be explained hereinafter. Opposed front and back plates 67 and 68, respectively, cover the front and rear of the casing body 60.

Casing 58 is formed to have an internal inlet tube 72 which is formed integrally with primary wall 62 and extends upwardly from an opening in base wall 63 (opening not illustrated). An inlet line 71 connected to the bottom opening of the inlet tube 72 provides a fluid communications path from the storage tank 22 to the inlet conduit. The top of the inlet tube 72 opens into a filtration chamber 73 defined by a web 74 that extends forward from primary wall 62 and a complementary cylindrical sleeve 78 integral with the front plate 65. A strainer 80 is disposed in filtration chamber 73.

Pump 26 includes a pump chamber 84 that is defined by a circular web 86 that extends forward from primary wall 63. A rotor 88 with vanes 90 is seated in chamber 84. A shaft 92 for actuating the rotor 88 extends forward from the casing 58 and through an opening 91 in front plate 67. The shaft 92 is the component of the pump 26 that is driven by motor 27. Fuel flows into the pump chamber 84 from the filtration chamber 73 through an inlet port 89 formed in web 86. Fuel is discharged from the pump chamber 84 through an outlet port 95 also formed in the web. Additional details regarding the structure of one pump may be found in the Applicant's Assignees' U.S. patent Ser. No. 08/915 445, filed Aug. 20, 1997, entitled LOW NOISE SUCTION PUMP now U.S. Pat. No. 6,030,191, published as PCT App. No. WO 99/09322 on Feb. 25, 1999, incorporated herein by reference.

Air separator 38 is built into the pump casing 58. Specifically, the casing body 61 is formed to have a generally tube like member 96 that extends perpendicularly through primary wall 62. The front and middle sections of member 96 have a constant, common diameter. Casing body 61 is formed to have a conduit 97 that extends from the outlet port 95 of the pump 26 into the forward end of the chamber defined by member 96. More particularly, it will be noted that the casing body 61 is formed so that conduit 97 is connected to the chamber along a line that extends tangentially towards the chamber. Thus, when fuel is discharged from the pump 26 it is initially flowed along the outer perimeter of the air separator 38.

The rear end of member 96 is inwardly tapered and is further shaped to have a circular opening 98. Opening 98 is contiguous with a discharge space 102 that is defined in part by a web 104 that extends upwardly from the inner face of base wall 63. The rear end of discharge space is sealed by a rib 106 that extends forward from the inner face of the back plate 68. Rib 106 has a shape that is identical to web 104. When the back plate 68 is fitted to the casing body 61, web 104 and the rib 106 are in registration with each other.

Figure 6:
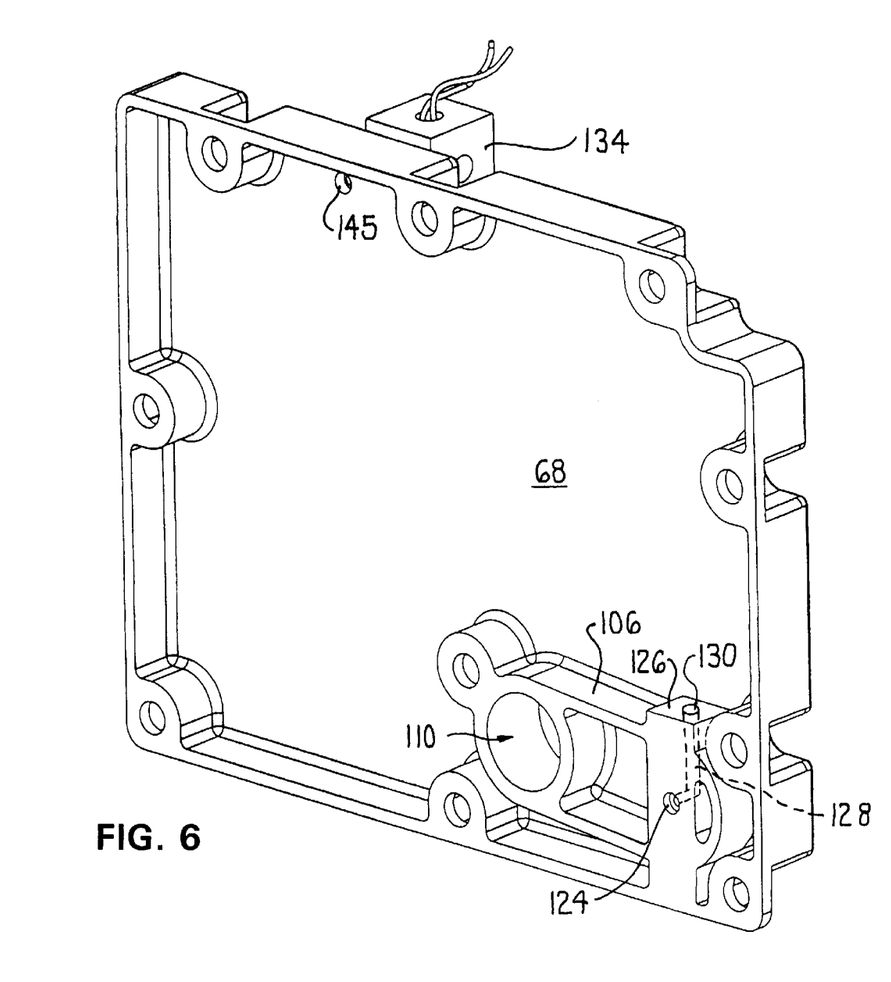
FIG. 6 is a view of the inner surface of the back plate of the pump casing.

Fuel flow out of discharge space 102 towards the nozzle 44 is through an opening 110 in the back plate 68. More particularly it will be observed that opening 110 is in registration with the space within a closed end rib 106.

Air separator 38 also includes a bleed tube 122 that extends into the rear end of member 96 through opening 98. Bleed tube 122 extends into an opening 124 formed in a finger 126 that extends upwardly from the bottom of base plate 68. Finger 126, it will be noted, extends through the upper and lower sections of rib 106. Opening 124 is one end of a conduit 128, shown in phantom, that extends upwardly through finger 126. Conduit 128 has a second end, opening 130, formed in the top of finger 126. Opening 130 opens into the air elimination chamber 41 which is defined by the back of the casing body 61 and that is sealed by the back plate. More particularly, air elimination chamber 41 extends from the back face of primary wall 62 to the opposed face of the back plate 68, between the opposed inner faces of the side walls 64 and between the opposed inner faces of base wall 63 and top wall 65.

The fuel in the air-and-fuel stream separated from the fuel in air separator 38 passively separates from the air in elimination chamber 41. This fuel is returned to the fuel stream that is supplied to the pump 26 through an opening 132 in the base of the inlet tube 72 above base wall 63. A float valve 132, depicted diagrammatically in FIG. 2, regulates fluid flow from the air elimination chamber 41 through opening 132 into inlet tube 72.

The air in the air elimination chamber 41 is exhausted, vented, to the outside atmosphere through a detector housing 134 as will be discussed hereinafter.

Figure 4:
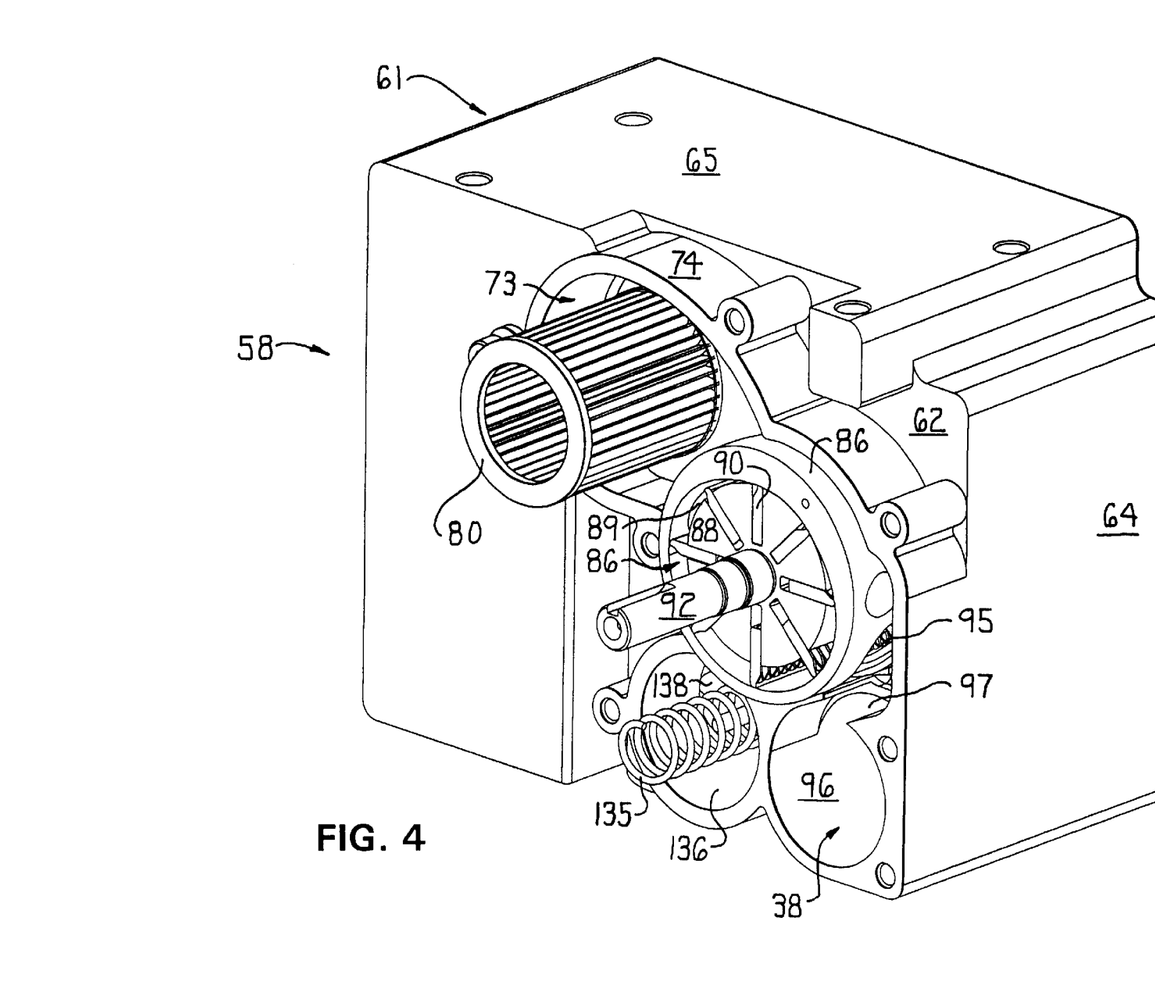
FIG. 4 is a view inside the front of the pump casing.
Figure 5:
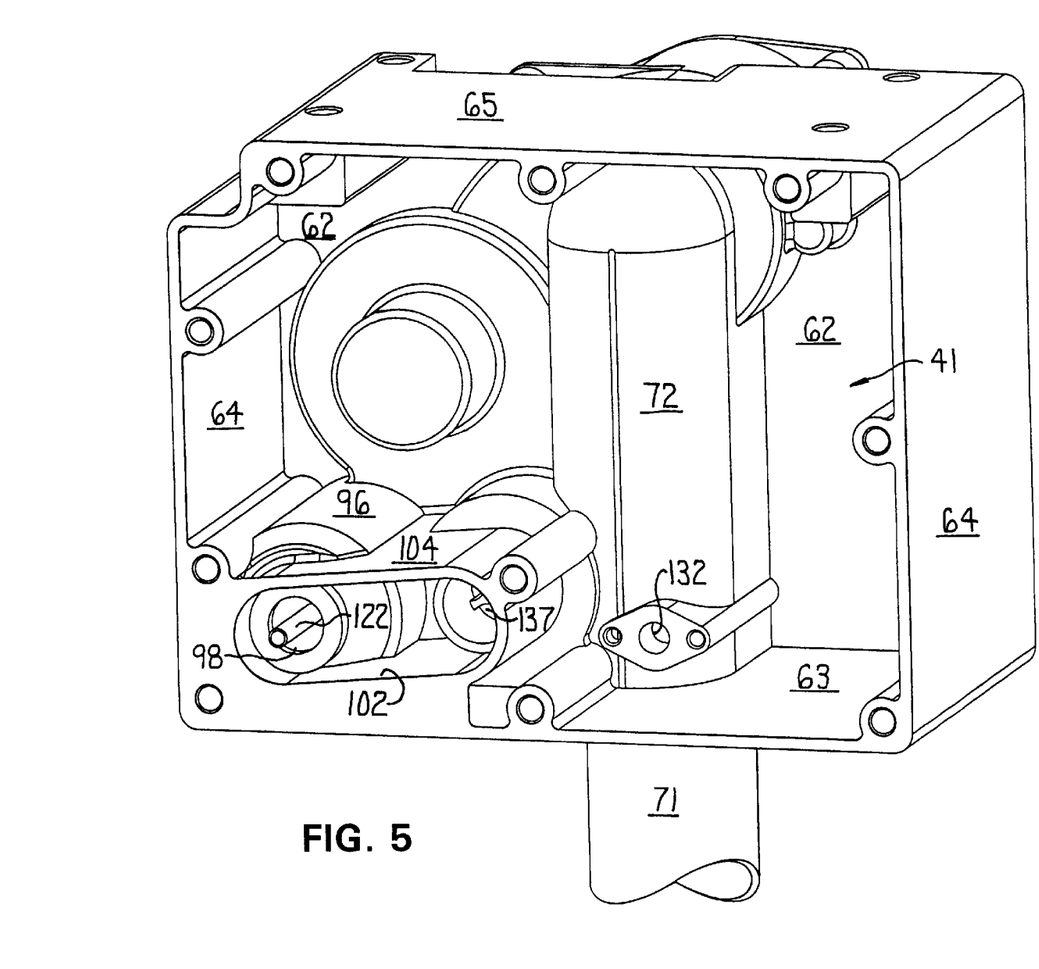
FIG. 5 is a perspective view of the rear of the pump casing.

The depicted pump casing 58 also includes a relief valve 129 shown schematically in FIG. 2 and seen partially in FIGS. 4 and 5. Specifically, there is an opening in primary wall 62, (opening not identified) adjacent member 96 through which fuel can flow from discharge space 102 to the front of the casing body 61. A valve member 137 is mounted to the front face of primary wall 62 to regulate flow through the opening. A spring 135 normally holds valve member 137 closed. In the event flow downline from the air separator 38 becomes blocked, the pressure head of the flow will overcome the force of spring 135 and force the valve member 137 open. The fuel will then flow into a chamber 136 formed in the front of casing body 61. An opening 138 in the casing body 61 then allows for fluid communication from chamber 136 back to inlet tube 72.

Figure 7:
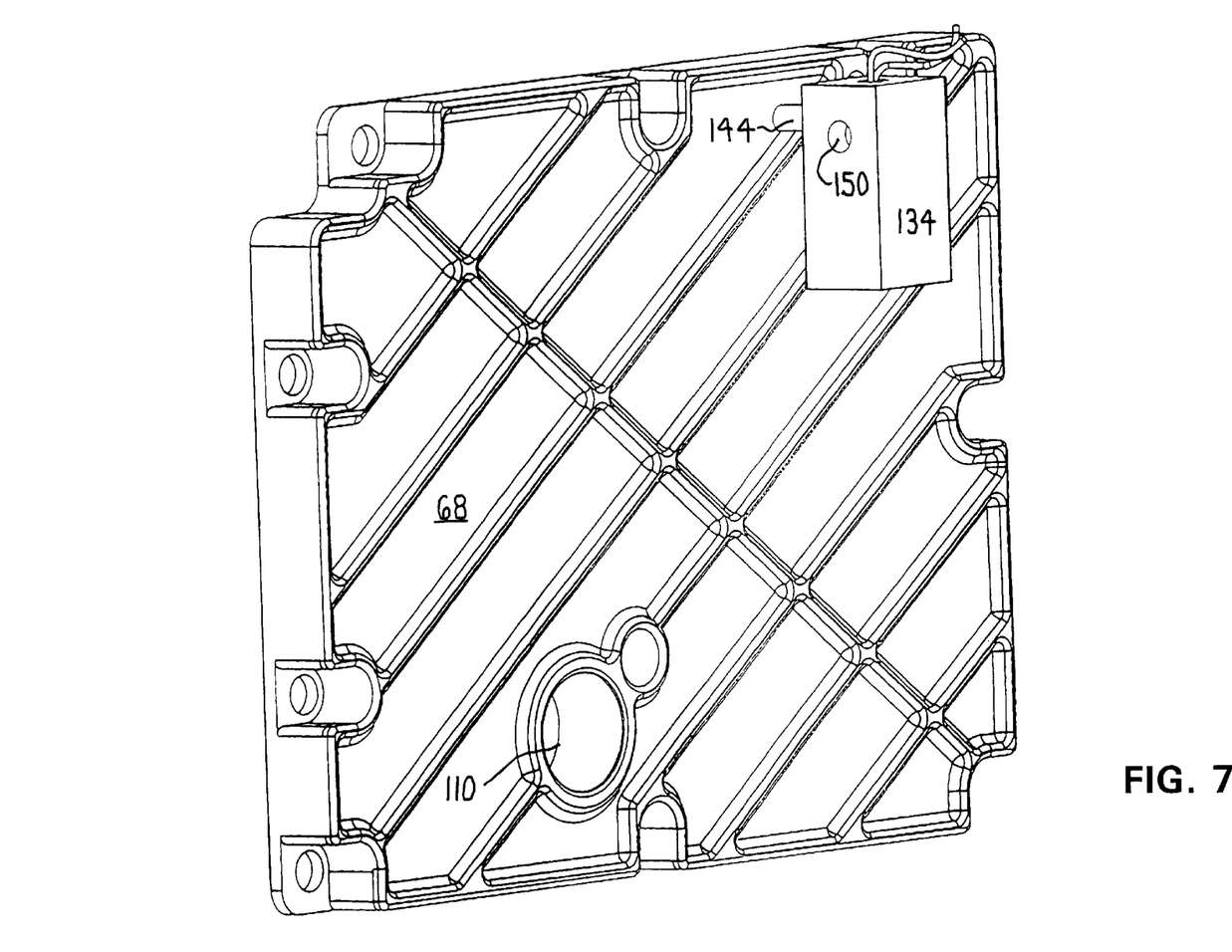
FIG. 7 is a view of the back plate of the pump casing the air detector housing.
Figure 8:
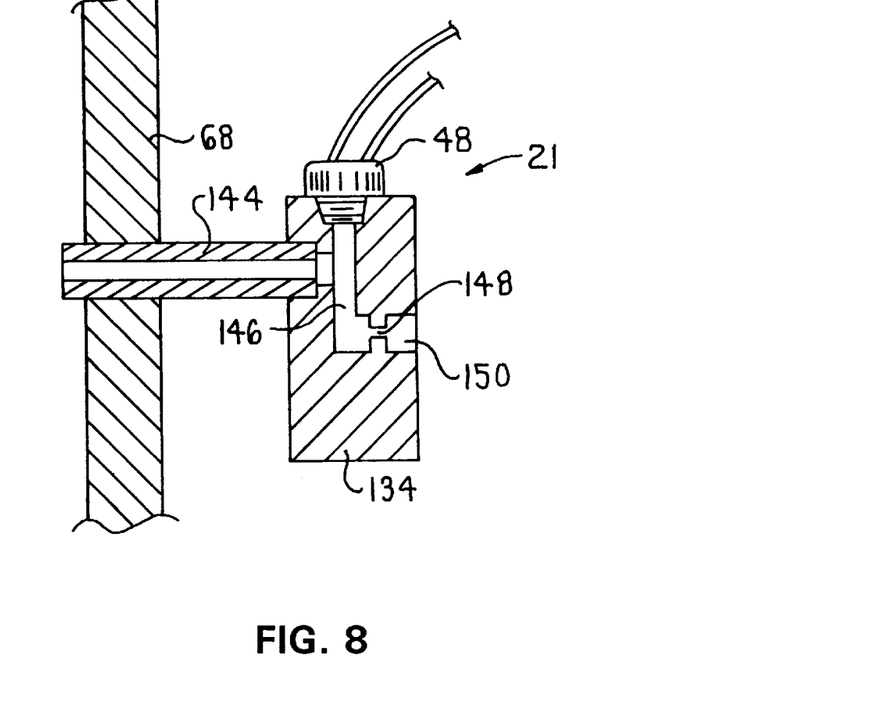
FIG. 8 is a cross sectional view of the air detector integral with the dispensing system of this invention.

The air detector system 21 of this invention is now described by reference to FIGS. 7 and 8. System 21 includes the detector housing 134. The detector housing 134 is connected to the back plate 68 of the pump casing 58 by a small connecting pipe 144. One end of pipe 144 is fitted to an opening 145 in plate 68 so as to be in communication with the air elimination chamber 41. The opposed end of pipe 144 is in communication with a bore 146 that extends downwardly from the top of detector housing approximately two thirds of the distance through the housing. The detector housing 134 is further shaped so that the base of bore 146 extends a small distance horizontally away from the longitudinal center axis of the bore. Downline from the bore 146, housing 134 is formed to define an orifice 148 that has a diameter less than that of the bore. In some preferred versions of the invention, orifice 148 has a diameter between 0.1 and 0.75 inches (0.25 to 2.0 cm). In more preferred versions of the invention, orifice 148 has a diameter of 0.4 to 0.5 inches (1.0 to 1.3 cm). Downstream from orifice 148 detector housing 134 has an exhaust port 150 through which air is bleed to atmosphere. Exhaust port 150 has a diameter that is greater than that of orifice 148. In the depicted version of the invention, exhaust port 150 has a diameter approximately equal to that of bore 146.

Transducer 48, the pressure switch, is mounted to the top of detector housing 134. The transducer 48 is fitted into bore 146 to monitor the pressure of the air exhausted by the dispensing system.

Dispensing system 20 of this invention operates in a conventional manor. Pump 26 draws a suction. This suction draws fuel from the storage tank 22 through lines 28 and 71 and inlet tube 72 to the pump 26. The pump 26 discharges the fuel to the air separator 38. Any air in the fuel stream discharged from the pump is forced to the center of the air separator 38, the center or the chamber defined by member 96. This air, along with any fuel also forced to the center of the air separator, is thus forced through the bleed tube 122. From the bleed tube 122, this mixture of air and fuel is flowed to the air elimination chamber 41. In the air separator 38 the substantially gas-free fuel stream flows along the outer perimeter of the space internal to the separator 38. This gas-removed fuel stream is discharged through conduit 42 to hose 32 through conduit 42 for delivery to the vehicle.

The fuel entrained in the air stream flowed to the air elimination chamber 41 passively separates from the air in the chamber. This fuel is then returned to the pump 26 through opening 132 and inlet tube 72. The air in the air elimination chamber 41 is vented to the ambient environment through connecting pipe 144 and detector housing 134.

Usually, the fuel stream discharged from the pump 26 is either air-free or contains only nominal amounts of air. Consequently, the fluid stream from the air separator 38 into the air elimination chamber 41 consists of fuel or a fuel-and-air mixture in which there is only a relatively small amount of air. When the dispensing system 20 is operating in this state, there is only a nominal air flow out of the detector housing 134. When the air flow is in this state, the air pressure in the detector housing 134 is not significantly higher than the atmospheric pressure. Accordingly, based on the signal from pressure switch 48, valve controller 56 holds valve 57 open. This allows unrestricted discharge of fuel from the dispensing system to the vehicle fuel tank 45.

There may, however, be instances when there are excessive amounts of air enter pump casing 58. This can happen if there is a line leak upstream from pump 26. If such a leak is present, air is drawn into the dispensing system 20 by the suction action of the pump 26. If there are large quantities of air in the fuel stream from the pump 26, a significant volume of air is, in turn, extracted from the fuel stream from the air separator 38. However, there may still be a significant percentage of gaseous state fluids (air and vaporized fuel) in the portion of the fuel stream that is directed to the delivery hose 32.

However, if this condition does occur, there is also a relatively large volumetric flow of air through air elimination chamber 41. The increase in flow rate becomes apparent by the rise in air pressure upstream of orifice 148. Once the pressure rise indicates that the rate of air flow through the air elimination chamber has exceeded a set level, the pressure sensor 48 undergoes an open/closed state transition.

This rise in pressure is, in turn, sensed by pressure switch 48. For example, in some preferred versions of the invention, pressure switch 48 is configured to undergo an open/closed state change whenever it senses that the pressure in the air elimination chamber 41 rises above 1 to 10 psi (gage). In more preferred versions of the invention, the pressure switch 48 undergoes an open/closed state change whenever the pressure rises above 2 to 6 psi (gage).

Specifically, pressure switch 48 undergoes a state transition when the pressure it monitors indicates there has been an increase in the rate of air flow through the dispensing system 20 but the actual volume of air flow is still below the volume of air that the air separator 38 can remove from the fuel stream. For example, in some versions of the invention, air separator 38 can remove essentially all the air from the fuel stream when the air flow is less than 30% by volume of liquid flow. In these versions of the invention, pressure switch 48 undergoes a state transition when the pressure it senses indicates that the air flow through the air elimination chamber 41 is starting to exceed 25% by volume of liquid flow.

The state change in the pressure switch 48 causes valve controller 56 to reset valve 57 to the closed state. The closing of valve 57 prevents fuel with excessive amounts of gaseous state fluid from being discharged.

An advantage of the air detector system 21 of this invention is that it operates by monitoring a parameter, flow rate, associated with a single fluid, the removed air, within the fuel dispensing system in which the monitoring system is installed. One benefit this arrangement is that this detecting system 21 only requires a single sensor, transducer 48, to perform the required monitoring. Moreover, the system only has to be configured to hold the single sensor. Collectively, these features make it relatively simple to provide the detecting system 21 of this invention.

Still another advantage of this system is that the parameter being monitored, the flow rate of the air through the air elimination chamber 41, only varies as a function of the volume of air entrained in the fuel flow. This variable is not affected by such other variables as cavitation, pressure or flow loss. Thus, by measuring this flow pressure, the detecting system 21 of this invention is able to precisely determine the quantity of air in the fuel stream. Then, before this volume of air exceeds that the air separator 38 can remove, the system prevents the dispensing of vapor-laden fuel.

Moreover, all one needs to do to adjust when the system 21 of this invention stops the dispensing of vapor laden fuel is to adjust the setting of the pressure at which switch 48 undergoes the open/closed state transition. Thus, once the system 21 is installed, it is a relatively easy task to adjust the system to ensure that, when the air pressure proportional to a select flow rate of air through chamber 41 is measured, the system prevents the fuel from being dispensed.

It should be recognized that the foregoing description is limited to one specific version of the monitoring system 21 of this invention. It will readily be apparent that alternative constructions of the invention can be provided. For example, it should be clear that the actual dispensing system 20 with which the monitoring system 21 is used may be different from the described monitoring system. More particularly, the structure of the pump and/or air separator may be very different from what has been described. Similarly, in other versions of the invention, the pump casing may vary from what has been described.

The structure of the air flow measuring circuit may also vary from what has been described. For example, in versions of the invention in which air pressure is measured in order to provide an indirect measure of air flow, other transducers may be employed to measure air pressure. For example, a transducer capable of measuring pressure and providing an analog signal representative of this pressure may be employed. In these versions of the invention, the output signal from the transducer may be applied as one input to a comparator. The second input to the comparator would be a reference signal. The comparator, based on the comparison of the two signals generates a signal to the valve controller 56 so as to cause the opening/closing of the valve. Alternatively, the transducer signal could be digitized. The digitized signal could then be applied to a circuit in which the digitized pressure signal is compared with a pressure level from a memory. Based on this comparison, the valve controller would open or close the valve.

Figure 9:
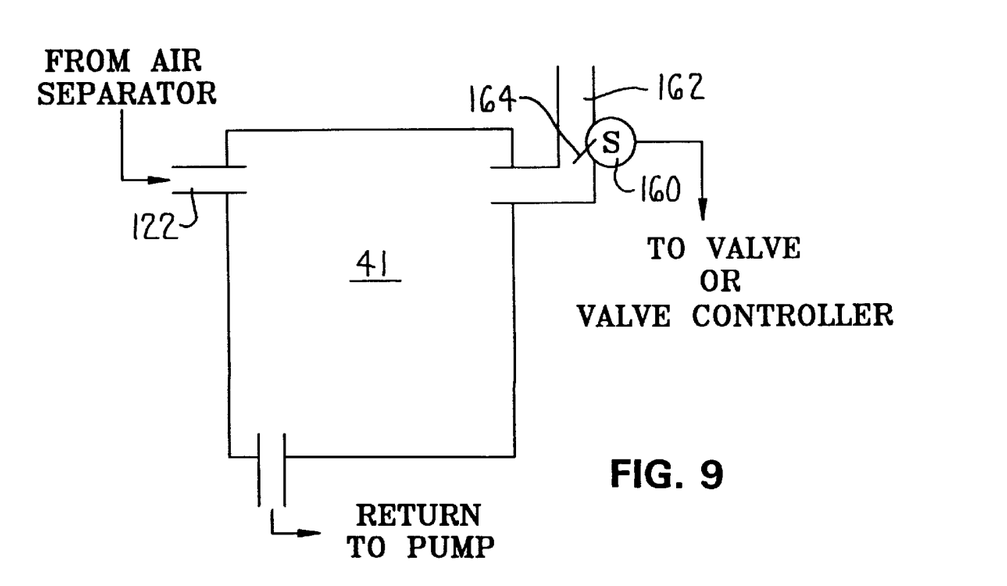
FIG. 9 is a diagrammatic depiction of an alternative transducer arrangement of this invention.

Moreover, in some versions of the invention, the air flow rate through the air elimination chamber 41 may be measured directly. For example, as seen in FIG. 9, a mechanical flow switch 160 may be fitted in the conduit 162 through which the air is discharged from the air elimination chamber 41. This type of switch 160 has a member 164 that is physically displaced when the flow through the conduit 162 to which it is mounted exceeds a given flow rate. In these versions of the invention, the switch may be mechanically linked to the valve so that the movement of the switch member opens/closes the valve. Thus, in some versions of this invention, it may not be necessary to provide an electrical circuit for regulating the open/closed state of the valve. In these versions of the invention, however, a series of fluid control valves may be necessary to provide a drive fluid that opens/closes the valve member internal to valve 57.

In some versions of the invention, there may be an electronic device that directly measures air flow rate through the air elimination chamber. For example, it may be desirable to measure the rate of fluid flow out of pipe 144 and have the pipe open to the atmosphere. This flow can be measured by forming the pipe 144 so that it has an venturi profile and fitting two pressure transducers in the bore. One of the transducers would be positioned at the wide-diameter entrance to the bore; the second transducer is positioned in the narrowest diameter section. In this version of the invention, the diameters of the pipe 14 at the points where the pressures are measured and the pressures themselves are known. From these data, it is possible to calculate the rate of fluid flow through the pipe 144. If this flow rate exceeds a select level, the system 20 of this invention prevents dispensing system 20 from discharging fuel.

Moreover, in some versions of the invention, it may not be necessary to provide the described detector housing 134. For example, in versions of the invention in which pressure is measured as indicia of air flow rate, the transducer that makes this measurement may be mounted directly in the air elimination chamber 41. Alternatively, in versions of the invention in which air flow rate is directly measured, the flow measuring assembly may simply be fitted in a conduit or opening that serves as the path through which the air is exhausted to atmosphere. These versions of the invention may not include the described detector housing 134.

Also, in some versions of the invention other means may be employed to stop the fuel from being dispensed. For example, instead of providing a fuel shut off valve, the transducer that measures air flow rate through the air elimination chamber 41 may be connected to a controller, a switch, that regulates the actuation of pump motor 27. Thus, whenever the system determines excessive air is flowing through the chamber 41, the system prevents further fuel from being pumped.

Accordingly, it is an object of the appended claims to cover all such modifications and variations as come within the true spirit and scope of the invention.

What is claimed is:

1. A fuel dispensing system for drawing liquid-state fuel from a storage tank to a nozzle, said dispensing system including:

a pump adapted to be connected to the storage tank for drawing fuel from the storage tank and for producing a fuel stream;

an air separator for receiving the fuel stream from said pump, said air separator configured to remove gaseous fluids from the fuel stream so as to produce a gas-removed fuel stream and a gas stream containing air and/or fuel;

an air eliminator having an air elimination chamber for receiving the gas stream from said air separator, said air elimination chamber having a first port through which liquid state fuel in the air elimination chamber is flowed to said pump and a second port through which air in the air elimination chamber is vented to an ambient environment;

a discharge conduit through which the gas-removed fuel stream from said air separator is flowed to the nozzle for discharge;

a transducer connected to the air elimination chamber for monitoring the rate of air flow through the second port of the air elimination chamber into the ambient environment; and a fuel shut-off assembly connected to said transducer for regulating fuel flow through said discharge conduit, wherein, when said transducer indicates that the air flow through the second port of the air elimination chamber exceeds a given rate, said fuel shut-off assembly prevents fluid flow from said discharge conduit to the nozzle.

2. The dispensing system of claim 1, wherein:

said transducer is a pressure sensor positioned to monitor the air pressure upstream of said second port of the air elimination chamber, wherein said pressure sensor is configured to undergo a state change when the air pressure exceeds a select pressure level; and said fuel-shut off assembly includes: a valve for regulating fuel flow through said discharge conduit; and a control unit connected to said valve for regulating the open/closed state of valve, wherein said control unit is connected to the pressure sensor for monitoring the state of said pressure sensor and opens/closes said valve based on the state of said pressure sensor.

3. The dispensing system of claim 2, wherein said pressure sensor is a bistate pressure switch.

4. The dispensing system of claim 1, further including:

a detector housing through which the air from the air elimination chamber flows prior to being vented to the ambient environment, said detector housing being formed to have: a conduit through which the air from the second port of the air elimination chamber initially flows, the conduit having a diameter; an orifice downstream of the conduit, the orifice having a diameter less than the diameter of the conduit; and an exhaust port downstream of the orifice through which the air is vented to the ambient environment, and wherein said transducer is mounted to said detector housing to measure air flow through the conduit of said detector housing.

5. The dispensing system of claim 4, wherein said transducer includes a moving member fitted to the conduit of said detector housing that is physically displaced as a function of the air flow rate through the conduit.

6. The dispensing system of claim 1, wherein said pump is a suction pump.

7. The dispensing system of claim 1, wherein said air separator is a cyclone separator.

8. The dispensing system of claim 1, wherein said pump is contained in a pump casing and said pump casing is formed to define the air elimination chamber.

9. The dispensing system of claim 1, wherein said transducer is a flow meter or a flow switch.

10. The dispensing system of claim 1, wherein:

said transducer generates an electrical transducer signal representative of the air flow through the second part of the air elimination chamber; and said fuel-shut off assembly includes: a valve for regulating fuel flow through said discharge conduit; and a control unit connected to said valve for regulating the open/closed state of valve, wherein said control unit is connected to said transducer for receiving the transducer signal and opens/closes said valve based on the state of the transducer signal.

11. The dispensing system of claim 1, wherein:

the air elimination chamber has a main body and a supplemental housing that extends from said main body, wherein: said main body is formed with the first port of the air elimination chamber; said housing is formed with a conduit that extends from said main body, said conduit being part of said air elimination chamber; and said conduit is formed with an opening to the ambient environment that is spaced from said body, the conduit opening being the second port of the air elimination chamber; and said transducer is fitted to said supplemental housing to monitor the rate of air flow through the conduit of said supplemental housing.

12. A fuel dispensing system for pumping liquid-state fuel from a storage tank to a nozzle, said system including:

a pump adapted to draw fuel from the storage tank and produce a fuel stream;

an air separator connected to said pump for receiving the fuel stream, said air separator configured to remove gaseous-state fluids from the fuel stream so as to produce a gas stream containing air and/or fuel and a gas-removed fuel stream;

a discharge conduit through which the gas-removed fuel stream from said air separator is flowed to the nozzle for discharge;

an air eliminator having an air elimination chamber for receiving the gas stream from said air separator, said air elimination chamber having a first port through which fuel in the air elimination chamber is flowed to said pump and a second port through which air in the air elimination chamber is exhausted to the ambient environment;

a transducer in fluid communication with the air elimination chamber for monitoring air flow out of the second port of the air elimination chamber into the ambient environment, wherein said transducer undergoes a state change as a function of the rate of air flow out of the second port of the air elimination chamber;

a selectively opened/closed valve for regulating fuel flow through said discharge conduit;

a valve controller for setting the open/closed state of said valve, said valve controller being connected to said transducer and responsive to the state of the transducer for opening/closing said valve as a function of the state of said transducer.

13. The dispensing system of claim 12, wherein said pump is a suction pump.

14. The dispensing system of claim 12, wherein said pump is contained in a pump casing and said pump casing is formed to define the air elimination chamber.

15. The dispensing system of claim 12, wherein said transducer is a pressure sensor positioned to monitor the pressure of the air flowed to the ambient environment through the second port prior to discharge of the air into the ambient environment, wherein said pressure sensor is configured to undergo a state change when the air pressure exceeds a select pressure level.

16. The dispensing system of claim 12, further including:

a detector housing through which the air from said air elimination chamber flows prior to being exhausted to the ambient environment, said detector housing being formed to have: a conduit through which the air from said air elimination chamber initially flows, the conduit having a diameter; an orifice downstream of the conduit, the orifice having a diameter less than the diameter of the conduit; and an exhaust port downstream of the orifice through which the air is exhausted to the ambient environment, and wherein said transducer is mounted in the conduit of said detector housing to monitor the rate of air flow through the conduit.

17. The dispensing system of claim 15, wherein said pressure sensor includes a bistate switch.

18. The dispensing system of claim 12, wherein:

a housing extends from said air eliminator, said housing being formed with a conduit, the conduit being in communication with and an extension of the air elimination chamber and the conduit having an end distal from said air eliminator that is open to the ambient environment, the open end of the conduit being the second port of the air elimination chamber; and said transducer is mounted to said housing to monitor the rate of air flow through the conduit.

19. The dispensing system of claim 18, wherein said transducer is a pressure sensor.

20. The dispensing system of claim 19, wherein said transducer includes a moving member that is displaced as a function of the rate of air flow through the conduit.

21. A method of dispensing liquid state fuel from a storage tank through a nozzle, said method including the steps of:

pumping the fuel from the storage tank to form a fuel stream;

removing gaseous-state fluids from the fuel stream, including vapor-state fuel, wherein, as a result of said removing step, a gas-removed fuel stream is formed and a gas stream containing air and/or fuel is formed;

forwarding the gas-removed fuel stream to the nozzle for dispensing;

forwarding the gas stream to an air elimination chamber and, in the air elimination chamber, separating the fuel from the air;

returning the fuel in the air elimination chamber to the fuel stream;

venting the air in the air elimination chamber through an orifice into the atmosphere;

measuring the flow rate of the air through the orifice into the atmosphere; and when the flow rate of the air through the orifice exceeds a fixed flow rate, stopping the dispensing of the fuel stream through the nozzle.

22. The method of dispensing liquid state fuel of claim 21, wherein said step of stopping the dispensing of the fuel stream comprises the blocking the flow of the gas-removed fuel stream to the nozzle.

23. The method of dispensing liquid state fuel of claim 21, wherein said step of pumping the fuel is performed by drawing a suction from the storage tank.

24. The method of dispensing liquid state fuel of claim 21, wherein a pump is employed to perform said step of pumping the fuel and, in said step of returning the fuel from the air elimination chamber, the fuel is flowed from the air-elimination chamber to an inlet port of the pump.

25. The method of dispensing liquid state fuel of claim 21, wherein:

the air in the air elimination chamber is flowed through a detector housing that is formed with the orifice through which the air is vented to atmosphere; and said step of measuring the flow rate of the air is performed when the air is flowed through the detector housing.

26. The method of dispensing liquid state fuel of claim 25, wherein:

said step of measuring the flow rate of the air is performed by measuring the pressure of the air in the detector housing.

27. The method of dispensing liquid state fuel of claim 21, wherein:

said pumping step is performed by selectively actuating a pump; and said step of stopping the dispensing of the fuel is performed by controlling actuation of the pump.

28. The method of dispensing liquid state fuel of claim 21, wherein:

in said step of venting air to the atmosphere, the air is flowed through a conduit and said conduit is formed with the orifice through which air is vented to the atmosphere; and said step of measuring the flow rate of air through the orifice is performed with a transducer that is fitted to the conduit.

29. The method of dispensing liquid state fuel of claim 28, wherein said step of measuring the flow rate of air through the orifice is performed by a transducer having a moving member that is displaced as a function of the low rate of air through the conduit.

* * * * *

UNITED STATES PATENT AND TRADEMARK OFFICE
CERTIFICATE OF CORRECTION

PATENT NO   : 6 179 163 B1
DATED       : January 30, 2001
INVENTOR(S) : William J. BOHR, et al.

It is certified that error appears in the above-identified patent and that said Letters Patent are hereby corrected as shown below:

```
Column 9, line 64; change "part" to ---port---
Column 12, line 46; change "low" to ---flow---
```

Signed and Sealed this

Twenty-ninth Day of May, 2001

Attest:

NICHOLAS P. GODICI

Attesting Officer

Acting Director of the United States Patent and Trademark Office